United States Patent [19]

Parent

[11] 4,209,054
[45] Jun. 24, 1980

[54] APPARATUS FOR REMOVING TIRES FROM THE RIMS OF HEAVY VEHICLES SUCH AS TRUCKS AND BUSSES

[76] Inventor: Jean-Marc Parent, Rte. 139, Wickham, Co. Drummond, Quebec, Canada, J0C 1S0

[21] Appl. No.: 893,808

[22] Filed: Apr. 5, 1978

[51] Int. Cl.² ............................................ B60C 25/06
[52] U.S. Cl. .................................................. 157/1.28
[58] Field of Search ...................... 157/1.17, 1.2, 1.26, 157/1.28

[56] References Cited

U.S. PATENT DOCUMENTS

| | | | |
|---|---|---|---|
| 2,521,149 | 9/1950 | Butler et al. | 157/1.2 |
| 2,546,900 | 3/1951 | Miller et al. | 157/1.2 |
| 2,832,400 | 4/1958 | Laughlin | 157/1.28 |
| 3,156,289 | 11/1964 | Dragoo et al. | 157/1.2 |
| 3,581,795 | 6/1971 | Bunch et al. | 157/1.2 |
| 3,972,363 | 8/1976 | West et al. | 157/1.26 |

Primary Examiner—James G. Smith

[57] ABSTRACT

An apparatus for removing tires from heavy vehicle wheel rims having an integral sealing lip on one side and a removable sealing ring secured in place by a locking ring on the other, is disclosed. The apparatus comprises a frame, a support member mounted on the frame and adapted to engage the inside diameter of the rim to support the wheel, a movable member located on the axis of the support member and adapted to contact the sealing ring and move it inwardly, so as to free the locking ring, thereby permitting removal of the locking ring and the subsequent removal of the sealing ring, and means for moving the movable member toward the support member.

2 Claims, 7 Drawing Figures

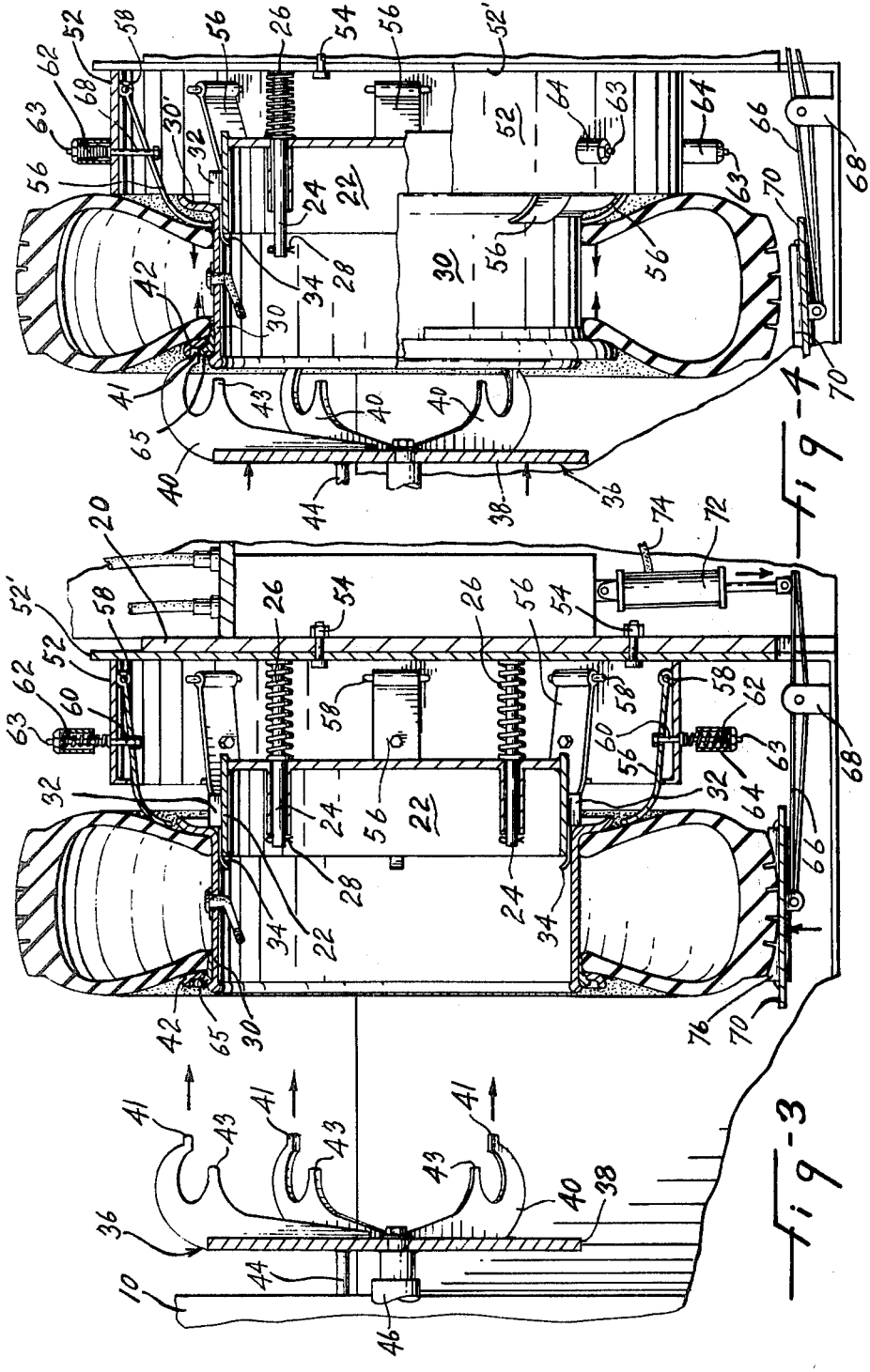

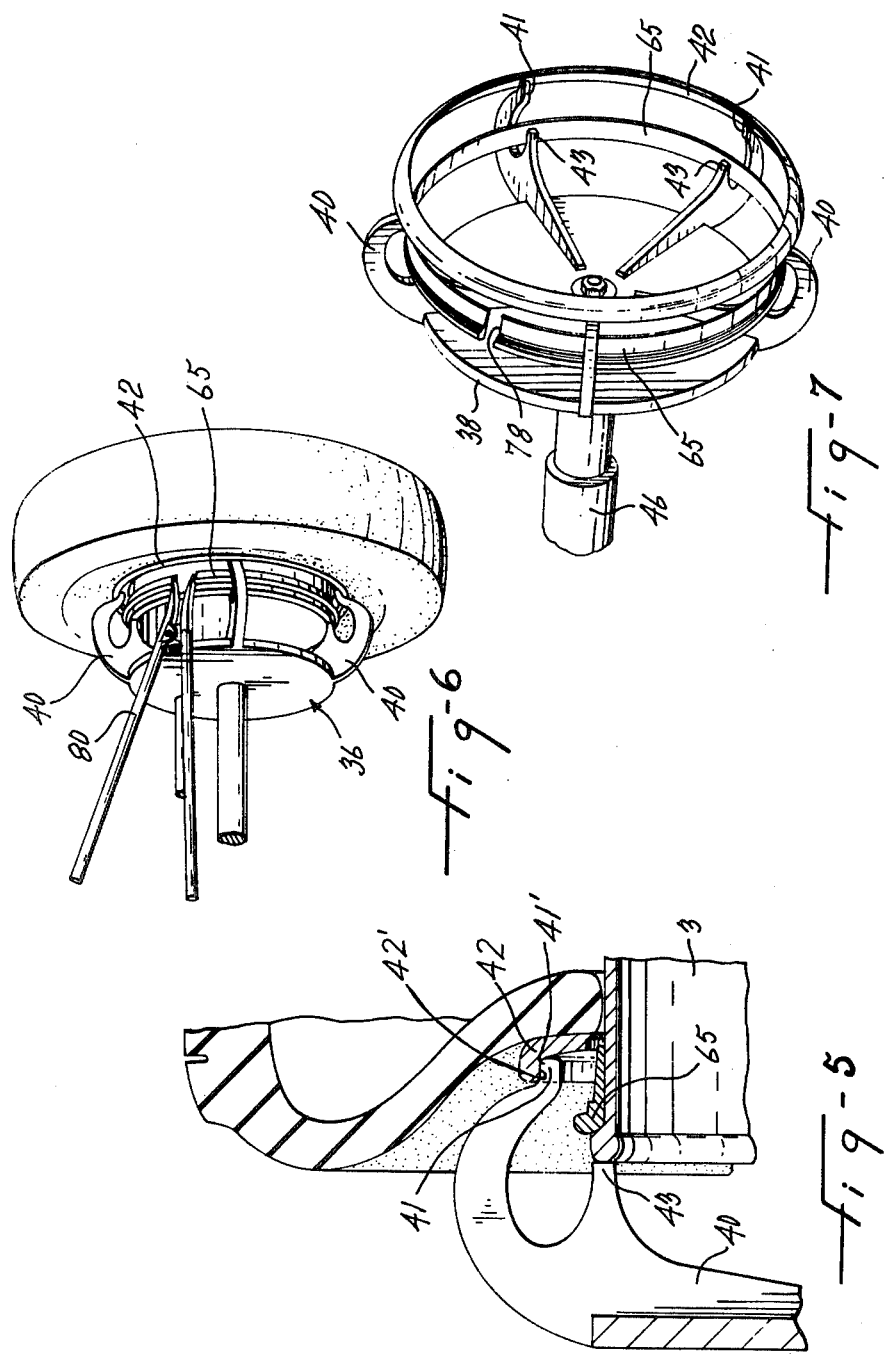

APPARATUS FOR REMOVING TIRES FROM THE RIMS OF HEAVY VEHICLES SUCH AS TRUCKS AND BUSSES

This invention relates to an apparatus for removing tires from the rims of the wheels of heavy vehicles, such as trucks and buses.

The wheels of trucks and buses are generally provided with rims having an integral sealing lip on one side and a removable sealing ring on the other side. Such sealing ring is held in place by a locking ring which has to be removed for taking the tire off the rim. It has been the general practice, up to now, to remove the tire, the locking rim and the sealing ring manually. This operation is time-consuming and requires hard labor, since the walls of the heavy duty tires are stiff and difficult to push away from the sealing edges of the rim.

It is therefore the object of the present invention to provide an apparatus for removing tires from heavy vehicle wheels which do not require hard labor and is also less time-consuming.

The apparatus, in accordance with the invention is used for wheels in which the sealing ring has an inwardly facing step. The apparatus comprises a frame, a support member mounted on the frame movable axially and adapted to engage the inside diameter of the rim to support the wheel, spring means biasing the support member to a rest position and located between the frame and the support member, finger-like elements pivotally carried by the frame and surrounding the support member and engageable with the side of the tire adjacent the sealing lip in the rest position of the support member and slidable between the sealing lip of the rim and the tire to disengage the edge of the tire from the sealing lip upon movement of the support member and further comprising a movable member located on the axis of the support member and means for moving such movable member toward and away from the support member. The movable member carries two sets of circularly disposed fingers with the fingers of the first set adapted to contact the sealing ring and frictionally engage said step, and with the fingers of the second set adapted to subsequently contact the wheel rim. Upon movement of said movable member toward the support member, the fingers of the first set first move the sealing ring inwardly so as to free the locking ring, thereby permitting removal of the latter and then the fingers of the second set contact the wheel rim and move the same inwardly together with the support member, so as to cause said finger elements to disengage the edge of the tire from the sealing lip and, upon movement of said movable member away from said support member, the sealing ring is withdrawn by said first set of fingers.

In order to place the heavy wheel on the support member, lever means are pivotally mounted on the frame and a platform for receiving the wheel attached to one end of the lever means, while a hydraulic cylinder is connected to the other end of the lever means for raising the platform. Rollers are preferably mounted on the platform for rotating the wheel to a desired position.

The invention will now be disclosed, by way of example, with reference to the accompanying drawing, in which:

FIG. 3 illustrates a section view, taken along lines 3—3 of FIG. 2;

FIG. 4 illustrates a section view such as FIG. 3 but showing the movable member in an intermediate position;

FIG. 5 illustrates a partial view of the movable manner in its fully operated position;

FIG. 6 illustrates how the locking ring is removed; and

FIG. 7 illustrates the locking ring and the sealing ring resting on the movable member after having been removed from the wheel rim.

Figure 1:
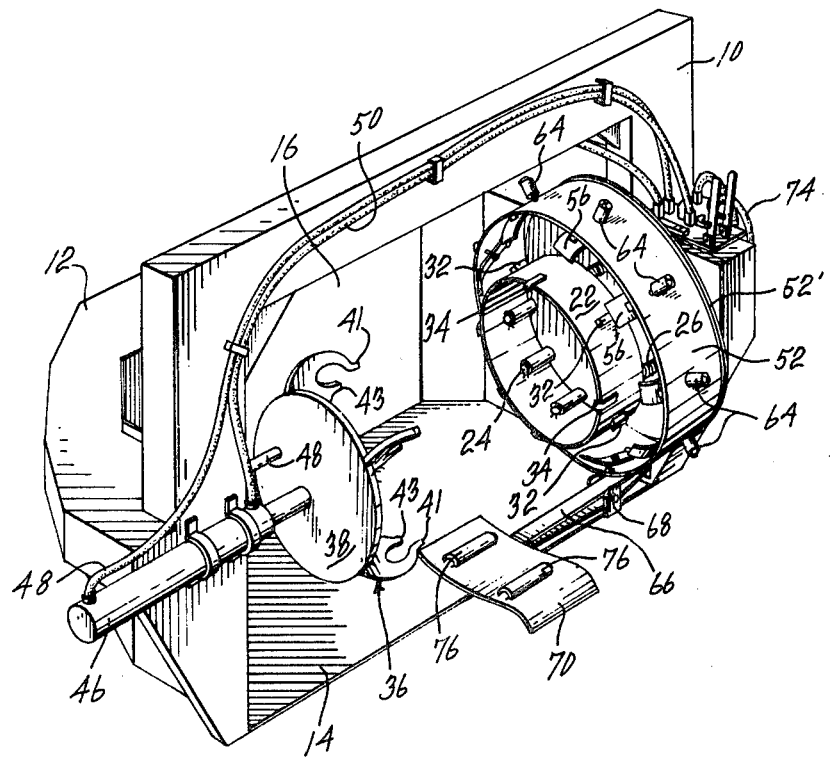
FIG. 1 illustrates a perspective view of the apparatus in accordance with the invention.
Figure 2:
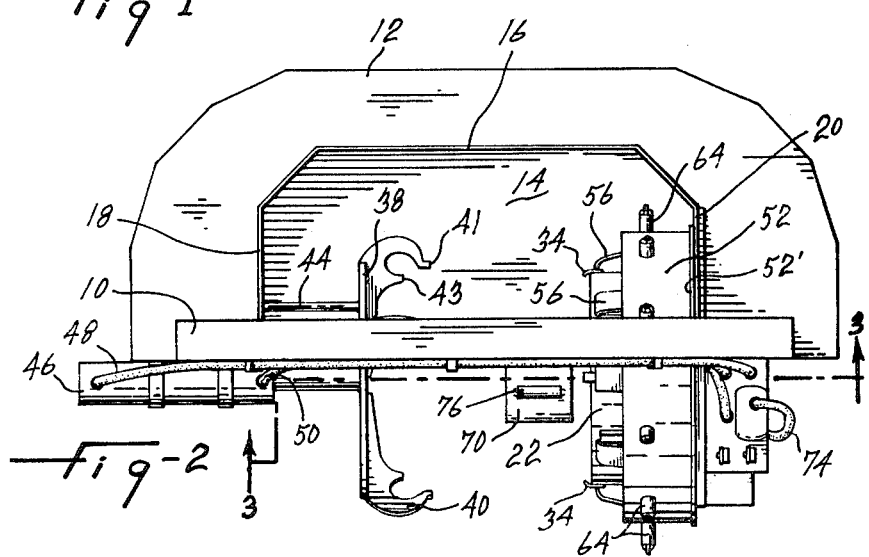
FIG. 2 illustrates a top plan view of the apparatus of FIG. 1.

Referring to FIGS. 1–4, there is shown an apparatus mounted on two C-shaped heavy duty frames 10 and 12 secured at right angle to each other. The bottom, the back and the side of the apparatus are made of heavy duty bottom plate 14, back plate 16, and end plates 18 and 20. A wheel support member 22 is mounted on a back plate 52' by means of pins 24. Back plate 52' is in turn removably secured to end plate 20 by bolts 54. The support member 22 is slidably mounted on pins 24 against the biasing force of a spring 26 and held in a rest position by lock pins 28. The support member is preferably cylindrical, so as to fully engage the inside diameter of the rim 30 of the wheel. The edge of the wheel rim 30 rests against abutment blocks 32 secured on the outside of the cylindrical support member 22. Curved plates 34 are also secured to the edge of the cylindrical support member to facilitate slipping of the wheel over the edge of the support member. It is to be understood that other forms of support members are also envisaged.

A movable member 36 is mounted on frame 10 for movement along the axis of the support member 22. The movable member consists of a circular plate 38 provided with four finger-like elements 40, each having one finger 41 adapted to engage the sealing ring 42 of the wheel and a second finger 43 adapted to engage wheel rim 30. The fingers 41 and 43 form two sets of fingers respectively arranged on two circles concentric with, and perpendicular to, the axis of the support member 22. The fingers 41 extend beyond the fingers 43 in the direction of the support member 22 and each finger 41 has an axially-extending outer face 41' disposed at such a radial distance from the axis of the support member that it will frictionally engage the inwardly-facing step 42' of sealing ring 42. The second fingers 43 are located at such a radial distance from the axis of the support member 22 that they will come in end-to-end contact with the outer end of the wheel rim 30. It is to be understood that the number of finger-like elements, as well as the shape of the movable member 36, may vary. A rod 44 is secured to the circular plate 38 and is slidably mounted in the end plate 18 for guiding the movable chamber 36. The circular plate is secured to the piston of a double acting air or hydraulic cylinder 46 operated by a suitable controller (not shown) over lines 48 and 50.

A cylindrical member 52 is secured to back plate 52'. A plurality of finger-like elements 56 are pivotally mounted on the inside of cylindrical member 52 by means of pins 58 and engage the side of the tire at their other end when a wheel is mounted on the support member 22. The finger-like elements 56 are curved at the end engaging the tire in the rest position of the support member 22 and adapted to slide between the sealing lip 30' of the rim 30 and the tire, so as to disengage the end of the tire from the sealing lip when the support member is moved axially. Each finger-like element 56 is held in a withdrawn position adjacent the inside wall of cylinder member 52 by means of a pin 60 passing through the wall of the cylinder member. A spring 62 is positioned between the outside wall of the cylinder member and the screw 63 of the pin for biasing the finger-like element toward the inside wall of the cylinder member. The spring 62 is covered with a cap member 64 for safety purposes. It is to be understood that other means of mounting the finger-like elements 56 on the frame are also envisaged.

Let us also mention here that the sealing ring 42 is locked in position by means of a lock ring 65.

In order to facilitate mounting of the tire on the support member 22, a lever 65 is pivotally mounted at 68 on the bottom plate 14 of the apparatus. A platform 70 is a pivotally secured to one end of the lever and a piston of an air or hydraulic cylinder 72 attached to the other. Operation of the cylinder through line 74 will raise the wheel to a position where it can be easily pushed over the edge of support member 22. The platform 70 is provided with rollers 76, permitting to rotate the wheel on the platform, so as to expose a cut 78 in the locking ring 65 (see FIG. 7).

The apparatus disclosed above operates as follows:

The wheel is rolled on the platform 70 and rotated on rollers 76 to expose the slot 78 in the locking ring 65. The platform 70 is then raised and the wheel mounted on the support member 22. As shown in FIGS. 3-5, cylinder 46 is then operated to move the fingers 41 of finger-like elements 40 against the movable sealing ring 42, and subsequently the fingers 43 of the finger-like elements 40 against the wheel rim 30 to push the entire wheel and support member 22 against the bias of springs 26: the finger-like elements 56 on the inside of the wheel, slide between the tire and the sealing lip 30' of the rim 30 and slide along rim 30 to disengage the edge of the tire from the sealing lip. Also fingers 41 push sealing ring 42 inwardly to clear locking ring 65. As shown in FIG. 6, a tool 80 is inserted in the cut 78 in locking ring 65 to spread the locking ring and make it slide over the edge of the rim. The locking ring 65 will simply rest on fingers 43 of the finger-like elements 40, as shown in FIG. 7. Upon operation of cylinder 46, in the reverse direction, the removable sealing ring 42 will either automatically be withdrawn by the fingers 41 of the finger-like elements 40, as shown in FIG. 7, or may be easily moved from the edge of the tire if it remains stuck to it. The tire may then be simply slipped over the edge of the rim remote from lip 30'.

Although the invention has been disclosed with reference to a preferred embodiment, it is to be understood that various alternatives of such embodiment are also envisaged and that the invention is to be limited by the scope of the claims only.

What I claim is:

1. An apparatus for removing tires from heavy vehicle wheel rims having an integral sealing lip on one side and a removable sealing ring secured in place by a locking ring on the other side, said sealing ring having a radially inwardly facing step, comprising:
   (a) a frame;
   (b) a spring-biased support member axially movably mounted on the frame and adapted to engage the inside diameter of the rim to support the wheel, said support member having a front end and a back end;
   (c) abutment means on the back end of said support member engageable with the sealing lip of the rim and retaining the rim in a limit position relative to said support member;
   (d) a movable member located on, and movable along, the axis of the support member and facing the front end of said support member and having a first set of fingers and a second set of radially inward fingers respectively arranged on a first and on a second circle perpendicular to said axis and concentric therewith, said fingers of said first set extending beyond said fingers of said second set in the direction of said support member the fingers of said first set having their outer ends radially outwardly spaced from said axis a distance to come in end contact with the portion of said sealing ring which is radially inward of said step and having an axially-extending outer face radially outwardly spaced from said axis a distance such as to have a friction fit with said step of said sealing ring, the fingers of said second set being radially outwardly spaced from said axis a distance to come in end-to-end abutment with said wheel rim;
   (e) means for moving said movable member toward and away from the support member; and
   (f) a plurality of finger-like elements mounted on said frame, arranged around said support member and engageable with the side of the tire at said one side of said rim in the rest position of the support member, movement of said movable member towards the support member causing said fingers of said first set to contact the sealing ring and move it inwardly relative to the wheel rim, so as to free the locking rim, thereby permitting removal of the locking ring, and subsequently causing said fingers of said second set to contact said wheel rim and push the same and said support member against the spring bias, so that the finger-like elements will slide between the sealing lip of the rim and the tire to disengage the edge of the tire from the sealing lip, and subsequent movement of said movable member away from the support member causing withdrawal of the sealing ring frictionally engaged by the outer faces of said fingers of said first set.

2. An apparatus as claimed in claim 1, further comprising a cylindrical member secured to said frame, co-axial with said support and extending over said support, said finger-like elements being pivotally mounted on the inside wall of said cylindrical member and normally held in a withdrawn position by means of spring-biased pins passing through the cylindrical member.

* * * * *